United States Patent [19]

Heller

[11] 4,386,926
[45] Jun. 7, 1983

[54] RELATIVELY RIGID SHEET PLASTIC FOLDING METHOD, APPARATUS AND ARTICLE

[76] Inventor: Joel Heller, 49 Kirkland Dr., Greenlawn, N.Y. 11740

[21] Appl. No.: 234,907

[22] Filed: Feb. 17, 1981

[51] Int. Cl.$^3$ .............................................. B31B 1/25
[52] U.S. Cl. .................................... 493/396; 493/61; 493/354
[58] Field of Search ............... 493/396, 397, 399, 404, 493/355, 61, 59, 354, 73; 264/320, 322

[56] References Cited

U.S. PATENT DOCUMENTS

| | | | |
|---|---|---|---|
| 2,552,353 | 5/1951 | Troth et al. | 493/355 X |
| 2,586,744 | 2/1952 | Troth | 493/61 X |
| 3,292,513 | 12/1966 | Palmer | 493/397 X |
| 3,334,802 | 8/1967 | Gooding | 229/37 R |
| 3,350,492 | 10/1967 | Grootenboer | 264/320 |
| 3,359,773 | 12/1967 | Stuchbery | 493/355 X |
| 3,379,814 | 4/1968 | Bracey, Jr. | 264/322 |
| 3,594,464 | 7/1971 | Ihde | 264/163 |

Primary Examiner—James F. Coan
Attorney, Agent, or Firm—Robert W. Fiddler

[57] ABSTRACT

A method, apparatus for forming, and article formed of folded, relatively rigid sheet plastic material (e.g. polyolefin is disclosed). A hinging membrane forming a flexible fold line provides stress-relief indentations in the sheet material so that the tensile and compressive strains normally produced when bending the sheet material at the folds are substantially relieved, thereby permitting efficient production of a variety of sheet plastic articles, such as folding containers and the like.

Two embodiments of the invention are disclosed.

In one embodiment, the stress-relief indentations are simultaneously formed on opposed surfaces of the sheet material at the desired fold line by an apparatus having an unheated die containing a scoring blade mounted for movement against the material to be scored, which is supported on a hard and polished platen, with the plastic sheet material arranged between the scoring blade and platen. The scoring blade and platen are brought to bear on the plastic sheet material disposed between them during the scoring operation to substantially reduce the material thickness along the fold line without substantial lateral displacement flow of the material away from the fold line. In this first embodiment, indentations are formed on opposed surfaces of the sheet material at the fold line which serves to relieve the tensile strains on the outer fold surface and compression strains on the inner fold surface normally produced when the material is bent about the fold line.

According to a second embodiment, the desired hinging membrane is formed along the desired fold line by compressing the relatively rigid sheet material by means of a wedge shaped creasing blade dimensioned to compress the sheet material along the desired line of folding to between 10% and 75% of its nominal thickness and flaring from the compressed surface to the material surface.

10 Claims, 6 Drawing Figures

RELATIVELY RIGID SHEET PLASTIC FOLDING METHOD, APPARATUS AND ARTICLE

BACKGROUND OF THE INVENTION

This invention relates to the art of forming fold lines in relatively rigid plastic sheet material such as polyolefins, and more particularly to a process and apparatus for forming fold lines in such material and to an improved container formed thereby.

With the recent development of extruding synthetic plastic materials, such as those in the polyolefin family, in which uniformity of sheet thickness and flatness are now attainable, it has now become a suitable material for the fabrication of folding cartons.

Previous efforts at forming fold lines in a sheet plastic carton blank to provide the necessary flexibility at the fold line to permit setting up the box from the flat blank have proved to be unsatisfactory due to the fact that damage or cracking of the sheet material occurs at or near the fold lines during folding. Also, when the box blank is flattened for storage or shipment, or when the flattened box is erected preparatory to filling, the panels and flaps of the box do not remain in the desired condition, but rather tend to revert to a state intermediate the flattened and opened conditions, due to the springness or elastic recovery tendency of the material being used to form the box. This elastic behavior tends to interfere with the automatic folding, filling and closing operations currently being practiced in commercial packaging facilities using paperboard boxes and cartons.

Scoring of sheet material to form a fold line has heretofore been performed by bringing a scoring blade against the sheet material, which is backed up by a platen, so that the sheet material is deformed out of the plane of the sheet to form the desired score line. In forming conventional paperboard boxes and cartons, the blades are unheated, and the fold line is formed by what is referred to as "cold scoring," as described for example in U.S. Pat. No. 3,137,217 and U.S. Pat. No. 3,529,516. Similar cold scoring techniques have been attempted in connection with plastic sheeting as indicated, i.e., in U.S. Pat. No. 3,334,802; U.S. Pat. No. 3,292,513; U.S. Pat. No. 3,594,464 and U.S. Pat. No. 3,350,492. Unfortunately, cold scoring has heretofore proven unsatisfactory when used in conjunction with existing thermoplastic sheet materials due to the fact that the cold deformation of these sheet materials, along the intended fold line, appears to produce a strain hardening of the material, resulting in fracturing and crazing along the score line, when the sheet material is folded or set-up into the carton. This problem is recognized in U.S. Pat. No. 3,589,022, which describes attempts to obviate this difficulty by employing heated scoring blades to form the desired score line indentation on one side of the sheet. It has, however, been found that even where the scoring blade is heated and brought down on one side of the sheet material sandwiched between the scoring blade and an unheated platen, with the scoring blade penetrating the sheet material on one side of the sheet, there is still produced a weakness and crazing discoloration of the plastic material, though perhaps not as great as in connection with cold scoring.

Other methods of hot-scoring plastic sheet material are described in U.S. Pat. No. 3,379,814. The use of plastic molding techniques for imparting fold lines is described in U.S. Pat. Nos. 3,132,649 and 3,201,145.

Therefore, a need has existed in the packaging field for a plastic material suitable for use in manufacturing folding cartons and boxes that would work in the identical way paperboard boxes do, and in existing folding carton making machinery, without the drawbacks of the prior art, which would be durable, easily handled and decorated in the same manner as folding paperboard containers.

BRIEF DESCRIPTION OF THE INVENTION

Accordingly, it is an object of the invention to provide an improved hinging membrane forming a fold line for use in plastic articles formed of relatively rigid plastic materials, such as polyolefins, with the material being subjected to minimum distortion at the fold line when the material is folded, thereby improving its strength and appearance.

Another object of the invention is to provide an improved process for forming fold lines in a relatively rigid plastic sheet material, such as an olefin, which imparts sufficient flexibility to permit formation of a carton or box from the material.

Another object is to provide an improved plastic folding container from relatively rigid sheet material such as an olefin whose walls are joined at fold lines with sufficient flexibility to permit setting up the container from a flattened or knocked-down condition prior to filling, without causing damage, tensile or compressive stresses, strain hardening, crazing or cracking of the sheet material at or near the fold lines while at the same time permitting the container to remain flattened until opened and thereafter remain in the intended open condition with minimum elastic recovery to facilitate machine loading.

Yet another object of the invention is to provide an apparatus for forming fold lines in relatively rigid plastic sheet materials.

These and other objects which will become hereafter apparent are achieved according to the present invention by forming a hinging membrane along a desired fold line in relatively rigid plastic sheet material. According to one embodiment of the invention, the hinging membrane is arranged to provide strain relief indentations at opposite sides of the sheet to relieve both tensile and compressive stresses normally produced at opposed surfaces of a fold line during bending, thereby minimizing crazing, material weakening and cracking during folding. The sheet material thus treated can be formed into a box or carton blank which can be shipped in a flat or knocked-down condition for set-up or erection when desired for use without exhibiting the undesirable elastic tendency to assume a position intermediate of the fully opened and closed conditions.

Scoring of the plastic sheet material to form the hinging membrane is accomplished according to one embodiment of the invention by the use of a blunt scoring blade mounted to press against the sheet material supported by a platen, preferably polished in the vicinity of the score line. The unheated scoring blade is brought against the unheated material to be scored at a pressure which substantially reduces the material thickness between the scoring blade and the platen, to a value of between 10% and 75% and preferably between 15% and 30% of the original nominal sheet thickness, with a value of between about 20%–25% being generally preferred.

According to the second embodiment, the scoring blade is formed with a tip formed in the shape of an inverted truncated equilateral triangle, which compresses the sheet material into a hinging membrane, along a line having a width between 10% and 75% of the nominal thickness of the sheet and forming an opening flaring out from the hinging membrane to the material surface.

BRIEF DESCRIPTION OF THE DRAWINGS

The specific details of the method, apparatus and article of the invention will be particularly described in conjunction with the accompanying drawings, wherein.

DESCRIPTION OF PREFERRED EMBODIMENTS OF THE INVENTION

Referring now more particularly to the drawings, like numerals will be employed to designate like parts.

The invention is directed to creasing relatively rigid sheet plastic materials, such for example as the olefins, and more particularly the polyolefins, including copolymers thereof.

High density polyethylene, extruded without orientation and polypropylene having a specific gravity of 0.90 to 0.96 lends itself well to this application. Obviously, the combination of both materials mixed by polymerization and extruded into a copolymer gives us the best results. Polyethylene, because of its nature, flexibility and strength and other properties, and polypropylene, because of its stiffness, hinge flex and stability together, extruded into a copolymer sheet with a percentage of 50-50, gives us the ideal combination and qualities required for folding carton application.

Although the precise chemical or molecular behavior of the plastic sheet at the score line is not clearly understood, it has been determined that optimum hingeability and flex-life of the score is obtained by practicing the invention on polyolefins with a specific gravity of between 0.85 and 0.98.

Additionally, the present invention can be practiced in scoring a wide variety of plastic sheet materials suitable for use in making boxes and cartons, including, but not limited to thermoplastic sheet materials, such as those containing polystyrene, polyethylene, polypropylene, polyester, nylon, formaldehyde polymers, poly (vinyl chloride), poly (vinylidene chloride) and related vinyl polymers, nitro cellulose, cellulose acetate, cellulose acetate butyrate, poly (methyl methacrylate), vinyl acetate, and acrylonitrile-butadiene-styrene resins. Such materials can be composed of homopolymers, copolymers or various blends thereof; they may also contain various additives known in the art, including colorants, plasticizers, heat stabilizers, extenders, impact modifiers, fillers, and inhibitors against degradation due to oxidation, ultraviolet light and the like.

Figure 1:
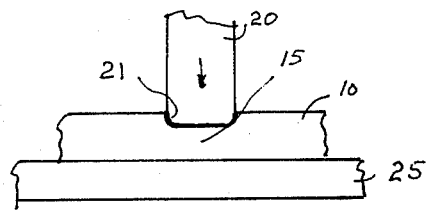
FIG. 1 is a schematic elevational view showing a section of creasing die in accordance with a first embodiment of the invention in the process of forming the desired hinging membrane.
Figure 2:
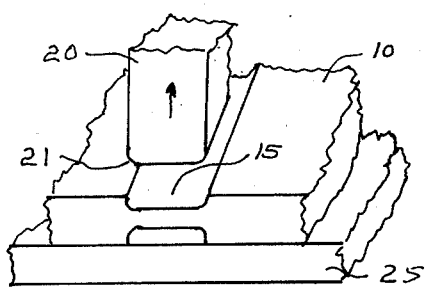
FIG. 2 is a schematic partial view of a section of a sheet, with the creasing die as in FIG. 1 being withdrawn therefrom to leave the desired hinging membrane.
Figure 3:
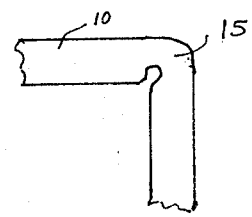
FIG. 3 is a schematic view of an end view of a sheet as formed in FIG. 2 bent 90° along the fold line illustrating how the formed crease relieves both tensile and compressive strains.

Satisfactory results can be obtained utilizing a variety of plastic material, of which the above are given by way of example, ranging in thickness from less than about 0.005 and greater than about 0.055 inch. The apparatus of the present invention is designed so that the scored material is substantially reduced in thickness between the scoring blade and platen. Desirably, the sheet material 10 as seen in FIGS. 1-3 is reduced in thickness to between about 10% and about 75% of the original nominal thickness of the sheet material. Preferably, the scored line forming the hinging membrane 15 is reduced to a thickness of between about 20% and 25% of the original thickness of the material. The width of the hinging membrane 15 is preferably of a width between 15% and 85% of the nominal thickness of the plastic sheet material being scored; the thicker the material the wider the scoring blades 20. In particular, a scoring blade width of 0.042 with a flat area on the creasing surface of 0.021 works well on sheet material between about 0.025 and 0.055.

As seen in FIGS. 103, the scoring blade 20 is formed with a relatively blunt bottom, preferably rounded at its edges 21 to facilitate penetration and release of the sheet material 10. This scoring blade 20 is mounted to move against sheet 10 supported at least along the desired fold line on platen 25, which is preferably formed of steel polished along the desired sheet fold line.

Figure 5:
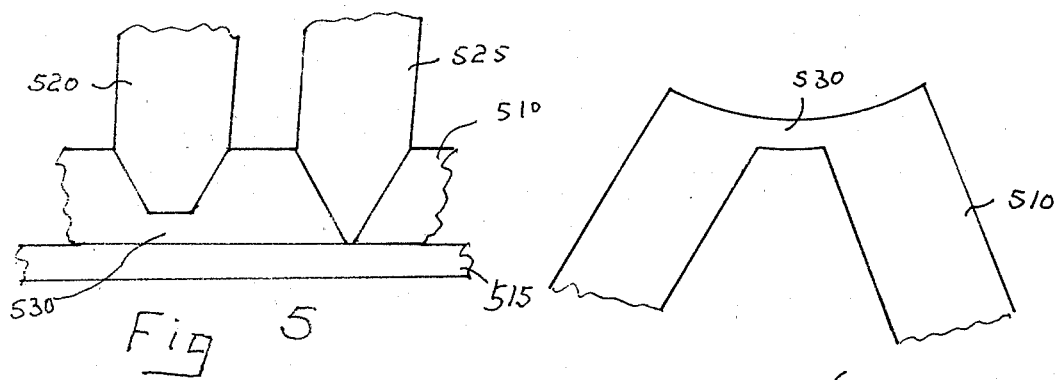
FIG. 5 is a schematic elevational view showing a section of a creasing die and cutting blade of a second embodiment of the invention.
Figure 6:
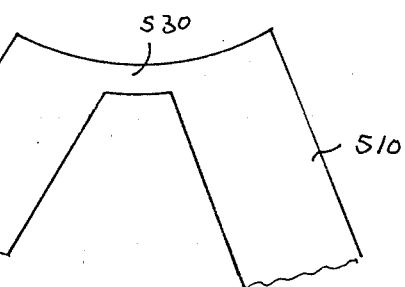
FIG. 6 is a schematic view of a section of a sheet formed by the die of FIG. 5 as bent.

In the embodiment of the invention illustrated in FIGS. 5 and 6, the relatively hard plastic sheet 510 of olefin or the like is shown supported on relatively hard platen 515 of steel or the like, polished in the area of material compression, with creasing blade 520 and cutting blade 525 mounted to move against the sheet 510, to form the hinging membrane 530.

In FIG. 6, the sheet material 510 is shown bent about the hinging membrane, illustrating how the hinging membrane facilitates desired folding.

Figure 4:
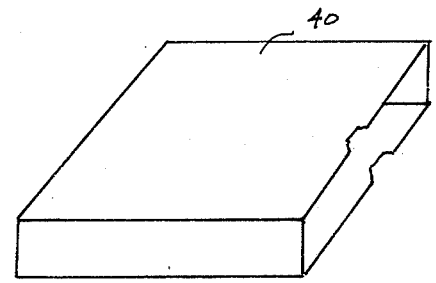
FIG. 4 is a perspective view of a typical container made in accordance with the invention.

FIG. 4 illustrates a typical container 40 which may be suitably formed of the scored and cut sheet material, whether the score lines are formed by a scoring blade as in FIGS. 1 and 2 or as in FIG. 5.

Photomicrographic examination of the score lines under polarized light indicates that there is an increase in density at the score line. Without wishing to be bound by theory, it is believed that when the material at both sides of the score line is compressed with the blunt creasing rule and pressure according to the present invention, the cracking and crazing conventionally encountered in cold scoring is eliminated, and a laminar continuity of molecular arrangements is attained within the plastic material. Examination under polarized light further indicates that, when the material is bent about the score lines formed in accordance with the invention, since the radius of curvature at the outer surface of the bend is substantially reduced by the indentation of this outer surface, the tensile strains at the outer surface of the material are substantially reduced. Similarly, the indentation on the inner surface at the bend reduces compressive strains thereat due to the fact that there is no material to be compressed at the inner material surface. Furthermore, it is observed that the strain relief indentations formed by scoring under pressure at the fold line according to the invention are brought about by a combination of compaction of plastic material between the indentations (resulting in increased density thereat) and physical removal of material from the scoring site. Surprisingly, these phenomena are unaccompanied by lateral displacement flow of material to the sides of the score line, which would result in the formation of a pair of ridges at the fold line as is observed, for example, in the process taught by U.S. Pat. No. 3,379,814. Such ridges are undesirable since they detract from the appearance of the material at the outer surface of the fold and tend to interfere with the operation of the stress-relief indentation at the inner surface of the fold.

The above disclosure has been given by way of illustration and elucidation, and not by way of limitation, and it is desired to protect all embodiments of the herein disclosed inventive concept within the scope of the appended claims.

What is claimed is:

1. Means for forming fold lines in relatively rigid plastic sheet material, said means comprising:
supporting means on which the sheet material is supported at least along the line of desired fold line formation, said supporting means comprising a steel platen polished in the area beneath the desired line of desired fold formation;
pressure applying means movable against the side of the sheet opposite the side of the sheet being supported along the desired line of folding, the magnitude of pressure sufficient to compress the sheet material to between 10% and 75% of its normal nominal thickness, the area of pressure extending over a strip having a width of between 15% and 85% of the normal nominal thickness of the sheet material to form a hinging membrane along the desired line of folding.

2. Means as in claim 1 in which said pressure applying means comprise a blunt nosed scoring blade having a thickness approximately equal to the nominal thickness of the sheet, with a nose contacting the sheet having a width at least 20% of the sheet thickness.

3. Means as in claim 1 in which said pressure applying means comprise a scoring blade in the shape of an inverted truncated equilateral triangle, the base of the triangle being between 50% and 110% of the thickness of the sheet material.

4. Means as in claim 3 in which the triangle is truncated to reduce its altitude by between 10% and 50%.

5. Means as in claim 4 in which a cutting blade congruent in contour to that of the scoring blade before truncation is arranged adjacent said scoring blade.

6. A container comprising walls of plastic sheet material joined by a hinging membrane lying along the desired fold lines of said container, said membrane formed of the same material as that of said container walls and of a thickness between 10% and 75% of the nominal thickness of said walls and formed by cold deformation of the sheet material between adjacent walls along the desired fold lines therebetween, and of a width between 15% and 85% of the nominal thickness of said walls, and deformation taking place against a steel platen polished in the area beneath the desired line of desired fold formation.

7. A method of forming fold lines in relatively rigid plastic sheet material, said method comprising the steps of:
supporting the sheet material along one side of the sheet material along at least the line along which the fold line is to be formed on a steel platen polished in the area beneath the desired line of desired fold formation;
applying pressure to the side of the sheet opposed to the one which is being supported along the line of desired folding, said pressure of a magnitude sufficient to compress the material along the desired fold line to between 10% and 75% of its normal nominal thickness, and applying the pressure over an area having a width of between 15% and 85% of the normal nominal thickness of the sheet material to form a hinging membrane along the desired line of folding.

8. A method as in claim 7 in which said step of supporting the sheet material is performed by arranging the sheet material on a hardened steel platen.

9. A method as in claim 7 in which pressure is applied by bringing a blunt nosed scoring blade down on the sheet material along the desired fold line.

10. A method as in claim 9 in which the pressure is applied by a truncated triangular ended scoring blade.

* * * * *